United States Patent Office 3,577,261
Patented May 4, 1971

3,577,261
SUBSTRATE WITH ADHERENT LAYER HAVING COLOR IMPARTED BY SAID SUBSTRATE
Kenneth K. Klar, Cuyahoga Falls, Ohio, assignor to The Goodyear Tire & Rubber Company, Akron, Ohio
No Drawing. Filed Nov. 25, 1968, Ser. No. 778,778
Int. Cl. B32b 25/04, 27/20
U.S. Cl. 117—80                                    4 Claims

ABSTRACT OF THE DISCLOSURE

A composite structure comprising a substrate and an adherent layer deposited thereon having a color imparted by the substrate prepared by the method which comprises (A) obtaining a substrate comprising a mixture of a rubbery polymer selected from the group consisting of natural rubber and synthetic rubber, at least one rubber processing oil and a dye soluble in the processing oil, (B) depositing a layer on the surface of the substrate comprising a mixture of a particulate pigment and a solvent for the said dye, the said layer colored by the pigment in contrast to the color of the dye and the color of the substrate, (C) dissolving a portion of the dye in the solvent contained in the deposited layer to effect a change in color of the layer, and (D) substantially drying the said layer.

---

This invention relates to a composite structure comprising a substrate having an adherent layer deposited thereon, the said layer having a color imparted thereto by the substrate, and to methods of preparing the composite structure.

Heretofore it has been desirable to prepare structures having adherent layers which are colored by the substrate upon which they are deposited and to provide a method of preparation therefor. Furthermore, it has been desired to provide a method of identifying and distinguishing solid rubber stocks from each other and liquid rubber cements from each other, particularly those which normally have similar appearances such as identity of color. For example, it has been desired to provide a simple distinguishing identification method for such materials when they have been compounded with common types of color imparting pigments such as carbon blacks. Such rubber stocks and cements typically are not easily distinguishable, separable and identifiable from other rubber stocks and cements if they have not been specifically marked or positioned for easy visual identification except by tedious and difficult chemical or physical tests.

Therefore, it is an object of this invention to provide a composite structure comprising a substrate having an adherent layer deposited thereon, the said layer having a color imparted by the substrate and a method for its preparation. It is a further object of this invention to provide a method of performing quick and simple identification tests an ordinary rubber stocks and rubber cements.

In accordance with this invention a composite structure has been prepared which comprises a substrate having an adherent layer deposited thereon, the substrate imparting color to the said layer, where the substrate comprises a mixture of a rubbery polymer, a rubber processing oil and a dye soluble in the processing oil, and where the said adherent layer is colored by the dye contained in the substrate and comprises a particulate pigment having a color contrasting to the said dye and substrate.

In the practice of this invention the composite structure comprising a substrate and an adherent layer deposited thereon having a color imparted by the substrate, is prepared by the method which comprises (A) obtaining a substrate comprising a mixture of a rubbery polymer selected from the group consisting of natural rubber and synthetic rubber, at least one rubber processing oil and a dye soluble in the processing oil, (B) depositing a layer on the surface of the substrate comprising a mixture of a particulate pigment and a solvent for the said dye, the said layer colored by the pigment in contrast to the color of the dye and the color of the substrate, (C) dissolving a portion of the dye in the solvent contained in the deposited layer to effect a change in color of the layer and (D) substantially drying the said layer.

To facilitate the identification of rubber cements, the substrate can be prepared by depositing a coat of a solution or dispersion of the rubbery polymer in a volatile organic solvent with the processing oil, dye and the various additives, if desired, on a surface and substantially drying the said coat to form the said substrate. The layer comprising the pigment is then deposited on the substrate and penetrated with the said dye to effect a color change in the deposited layer.

The rubber cements can contain various amounts of the rubbery polymer such as from about 2 to about 40 parts by weight of the rubbery polymer mixed with 100 parts by weight of the solvent. It is understood that cements having various viscosities may be desired and that the various polymers are soluble in the solvents in various degrees. The various solvents normally used by those skilled in the art for the preparation of rubber cements are suitable. Representative of the various solvents are aromatic hydrocarbons such as benzene, toluene, and xylene, normally liquid ketones such as methyl ethyl ketone, diisobutyl ketone, methyl isobutyl ketone and ethyl amyl ketone, normally liquid alcohols such as methyl alcohol, ethyl alcohol, propyl alcohol, isopropyl alcohol, butyl alcohol and isobutyl alcohol and gasolines, particularly naphtha-type gasolines.

The rubber processing oils used in this invention are also known in the art as "rubber extending oils" and "compatible rubber processing oils." These terms refer to oils that are miscible in the rubbery polymer and after mixing with the rubber do not excessively migrate to its surface.

The rubber processing oils are normally derived from petroleum although they can also be derived from coal tar and other sources such as rosin oils. Representative processing oils are more fully described in U.S. Pat. 3,081,276. The processing oils are usually composed primarily of paraffinic hydrocarbons, naphthenic hydrocarbons and aromatic hydrocarbons. Such oils are well-known commercial oils normally used in rubber compounding which are generally high-boiling petroleum fractions obtained after gasoline, fuel oil and other lower boiling materials are removed by distillation. They normally have a viscosity of from about 10 centipoises at 100° C. up to semi-solid materials softening at about 40° C. to about 90° C. They usually have a boiling point of from about 50° C. to at least about 200° C. and higher. For example, many processing oils have a boiling point of at least about 245° C. at 10 millimeters of mercury. They normally have a specific gravity (60/60° F.) of from about 0.9 to about 1.05.

In the practice of this invention the substrate can be prepared by mixing the rubbery materials in their dry state or as a solution or dispersion with the rubber processing oils. Usuallly from about 2 to about 40 parts by weight of the processing oils are mixed with 100 parts by weight of a rubbery polymer.

Natural and synthetic dyes can be mixed with the rubbery polymer and rubber processing oil to form the substrate. It is desired that the dyes are soluble in the processing oil, preferably having a solubility of at least about 10 parts by weight of dye per 90 parts by weight of rubber processing oil. The synthetic dyes are mainly derivatives of the aromatic hydrocarbons such as benzene, toluene, naphthalene and anthracene. Dyes are known to those skilled in the art as molecularly complex organic compounds which contain groups that confer color, generally called chromophores. Exemplary of chromophores are azo groups, nitro groups, nitroso groups and ortho and para quinonoid goups. Such groups convert a molecule into a chromogen capable of imparting color. Other groups can be introduced into the molecule, if desired, called auxochroms to enhance the dyeing properties of the chromogens. Representative examples of auxochroms are hydroxyl groups, ammonium groups, secondary amine groups and sulfone groups. Representative examples of suitable dyes are more fully described in "The Chemistry of Synthetic Dyes," volumes I and II, by K. Venkataraman, 1952, published by Academic Press, Inc., New York, and in "Organic Chemistry," by W. T. Caldwell, 1943, published by Houghton Mifflin Company in its chapter entitled "Synthetic Dyes," pages 702–725.

Dyes are classified in various ways. For example, one classification is based upon methods of application of dyes. According to this classification dyes have been classified as acid dyes, basic dyes, direct or substantive cotton dyes, mordant dyes, vat dyes, ingrain dyes and sulfur dyes.

Dyes can also be classified according to their chemical constitution. For example, dyes have been classified as nitroso and nitro dyes, azo dyes, stilbene dyes, triphenylmethane dyes, aurine phenolphthalein dyes, fluorescein dyes, rhodamine dyes, mauveine dyes, methylene blue dyes, indigoid dyes, Caledon jade green dyes, indanthrene blue dyes, sulfur dyes and cyanine dyes.

Very small amounts of the dye are usually necessary. The quantity of dye needed to impart color to the adherent layer can easily be determined by one skilled in the art. Usually from about 0.1 to about 5 parts by weight of the dye are mixed with 100 parts by weight of the rubbery polymer of the substrate.

In the practice of this invention an adherent layer is deposited on the substrate, preferably having a thickness of from about 0.5 to about 20 mils and preferably from about 5 to about 10 mils. The layer can be deposited by various methods such as by brushing, dipping, and spraying. It is preferable to deposit a composition colored by a pigment as a dispersion comprising a mixture of a volatile organic solvent and a coloring particulate pigment having a color contrasting with the rubbery material of the substrate with the color of the dye contained in the rubbery material of the substrate. The pigments have a particle size of from about 0.1 to about 10 mils and preferably from about 0.5 to about 5 mils. It is usually preferred that they are essentially insoluble in the rubber processing oils and the solvents used in the method of this invention. The pigments are of various compositions known to those skilled in the art. For example, representative white pigments are antimony oxide, titanium dioxide, zinc oxide, and white lead. It is usually desired that the dispersion also contain a resin binder for the pigment. The various resin binders are well known to those skilled in the paint art. Various solvents normally used for paints can be used. It is preferred that the dyes used in the substrate have a solubility of at least 10 parts of dye per 90 parts of the solvent. Representative of various solvents are aromatic hydrocarbons such as benzene, toluene, xylene; liquid ketones such as acetone, methyl ethyl ketone, diisobutyl ketone, methyl isobutyl ketone and ethyl amyl ketone; acetate esters, naphtha, terpentine, and liquid alcohols such as methyl alcohol, ethyl alcohol, propyl alcohol and butyl alcohol. Various drying oils can be added to the paint which includes drying oil-modified alkyd or epoxy resins. The dispersions can also contain as minor constituents plasticizers, driers and extenders.

The following example further illustrates the advantages of this invention and is not intended to be limiting. The parts and percentages therein are by weight unless otherwise indicated.

EXAMPLE I

Three rubber cement mixtures, colored black by carbon black, were prepared and for convenience are now labeled Cements A, B and C. Cement A was prepared from natural rubber, furnace black, a rosin rubber processing oil, accelerators, and a processing oil soluble red dye. Cement B was prepared from natural rubber, hot butadiene-styrene rubber, furnace black, a rosin rubber processing oil, accelerator and a processing oil soluble yellow dye. Cement C was prepared from natural rubber, butadiene-styrene rubber, furnace black, accelerators, naphthenic rubber processing oil, and a processing oil soluble blue dye.

Three rectangular strips of white cardboard having a thickness of about 0.06 inch, a length of 8 inches and a width of ¾ inch were prepared and are now identified as strips A, B and C. The lower half of each cardboard strip was thinly coated by dipping each of the strips in a corresponding rubber cement mixture and drying for about 30 minutes at about 25° C. The black rubbery coats had a thickness of about 10 mils. The coated cardboard strips, for convenience, are identified here as Samples A through C to correspond to the dried cement Coatings A, B and C.

A white colored layer comprising a mixture of titanium dioxide pigment, a resin binder and a mixture of ethyl amyl ketone xylene and toluene was deposited over each of the dried rubber cement coatings on the cardboard strips by dipping. The layers were partially dried at about 25° C. for about 30 seconds. The white layers had a thickness of about 10 mils.

After the period of about 30 seconds from depositing the white colored layers over the coatings, the white layers on Samples A through C changed to the colors of red, yellow and blue corresponding to the dye in Cements A through C. Thus, the black colored rubber cements were easily and quickly distinguishably identified by the method of this invention.

In this example the rubber cements comprised the following composition:

| | Parts | | |
|---|---|---|---|
| Compound of cement | A | B | C |
| Natural rubber | 100 | 80 | 20 |
| Butadiene-styrene rubber | | 20 | 80 |
| Sulfur | 4 | 3 | 2.5 |
| Carbon black | 50 | 50 | 63 |
| Dye | [1] 0.3 | [2] 0.5 | [3] 0.3 |
| Rosin rubber processing oil | 3 | 4 | |
| Naphthenic rubber processing oil | | | 18 |
| Accelerator and activator | 1.8 | 1 | 4 |
| Resin tackifier | 5 | 0.5 | |
| Resins | 0 | 10.5 | 100 |
| Zinc oxide | 0 | 3 | 3 |
| Stearic acid | 1 | 0.7 | |
| Solvent | [4] 166 | [4] 155 | [5] 264 |

[1] Sudan yellow; N,N-dimethyl-p-(phenyl-azo)aniline.
[2] Sudan red G; 1-(o-methoxyphenyl-azo)2-naphthol;
[3] Sudan blue II.
[4] Rubber solvent grade gasolene and isopropyl alcohol.
[5] Rubber solvent grade gasolene, toluene, methyl ethyl ketone and isopropyl alcohol.

In this example, before drying, the white deposited layer comprised the following composition:

Compounds: Parts
    Titanium dioxide pigment _____ 180
    Resin binder _____ 145
    Solvent [1] _____ 551
    Stabilizer _____ 3
    Propylene oxide _____ 3

[1] Mixture of ethyl amyl ketone, ethylene, toluene and hexane.

In the practice of this invention, the various synthetic rubbers can be used to form the substrate. Representative of the various synthetic rubbers are rubbery copolymers of butadiene and styrene which contain a major portion of butadiene, particularly copolymers of butadiene and styrene of the hot and cold SBR type which contain from about 60 to about 90 percent by weight of butadiene, rubbery copolymers of butadiene and acrylonitrile, butyl rubber which is a polymerization product of a major portion of a monoolefin such as butylene, and a minor portion of a multi-olefin such as butadiene and isoprene, rubbery copolymers of ethylene and propylene, rubbery terpolymers of ethylene, propylene and a minor portion of a diene, rubbery polymers of 1,3-butadiene and rubbery polymers of isoprene.

In the example, if desired, rubber stocks comprising a rubber polymer, rubber processing oil and a processing oil soluble dye can be substituted for the dried rubber cement and quickly identified and distinguished.

The method of this invention is further suitable for preparing compositions which comprise a substrate having an adherent layer deposited thereon, where the layer is pigmented and therefore not transparent or translucent, and has a color imparted by the substrate, which have unique decorative utility for many commercial articles.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a composite structure comprising a substrate and an adherent layer thereon, the layer having a color imparted by the substrate, where the substrate comprises a mixture of a rubbery polymer selected from the group consisting of natural rubber and synthetic rubber, at least one rubber processing oil and a dye soluble in the processing oil, wherein the method comprises (A) depositing a coating composition on the surface of said substrate comprising a mixture of particulate pigment having a color different from the color of the dye in the substrate and a solvent for the dye in said substrate, where the coating composition is colored by its pigment in contrast to both the color of the substrate and dye contained therein, and where a portion of the said dye in the substrate is dissolved in the solvent contained in the deposited coating to thereby effect a change in the color of the coating, and (B) substantially drying the deposited coating to form the adherent layer on the substrate.

2. The method according to claim 1 where the rubbery polymer is selected from the group consisting of natural rubber, rubbery copolymers of butadiene and styrene, rubbery copolymers of butadiene and acrylonitrile, rubbery copolymers of butylene and isoprene, rubbery copolymers of ethylene and propylene, rubbery terpolymers of ethylene, propylene and a minor portion of a diene, rubbery polymers of butadiene and rubbery polymers of isoprene, where the dye has a solubility of at least 10 parts of dye per 90 parts by weight of the processing oil and where the said deposited layer contains a resin binder for the pigment.

3. A method for identification of a rubber cement comprising a mixture of a rubbery polymer selected from natural rubber and synthetic rubber in a volatile organic solvent, a rubber processing oil and a dye soluble in the processing oil, where the method comprises (A) depositing a coat of the rubber cement on a surface and drying the rubber cement to form a rubbery substrate, and (B) coating the said rubber substrate with a coating composition comprising a pigment having a color different from the color of the dye in the rubber cement in a volatile organic solvent, where the coating composition is colored by its pigment in contrast to both the color of the rubbery substrate and dye contained therein, and where a portion of the said dye in the rubbery substrate is dissolved in the solvent contained in the coating composition to thereby effect a change in the color of the pigment coating, and (C) drying the pigment coating.

4. A method according to claim 3 where the rubbery polymer is selected from the group consisting of natural rubber, rubbery copolymers of butadiene and styrene, rubbery copolymers of butadiene and acrylonitrile, rubbery copolymers of butylene and isoprene, rubbery copolymers of ethylene and propylene, rubbery terpolymers of ethylene, propylene and a minor portion of a diene, rubbery polymers of butadiene and rubbery polymers of isoprene, where the pigment in the coating composition is selected from antimony oxide, titanium dioxide, zinc oxide and white lead and where the said coating composition contains a resin binder for the pigment.

References Cited

UNITED STATES PATENTS

| 2,786,785 | 3/1957 | Wise | 117—138.8U |
| 3,042,633 | 7/1962 | White | 117—138.8U |
| 3,366,623 | 1/1968 | Ronco | 117—139 |

FOREIGN PATENTS

| 611,421 | 1948 | Great Britain | 117—139 |

OTHER REFERENCES

Industrial Finishing, "Special Rubber-Base Finishes for Rubber Products," by Herbert H. Watjen, vol. 25 (1948), 117-139.

WILLIAM D. MARTIN, Primary Examiner

J. E. MILLER, JR., Assistant Examiner

U.S. Cl. X.R.

73—150; 117—118, 138.8, 139

PO-1050
(5/69)

UNITED STATES PATENT OFFICE
CERTIFICATE OF CORRECTION

Patent No. 3,577,261      Dated May 4, 1971

Inventor(s) Kenneth K Klar

It is certified that error appears in the above-identified patent and that said Letters Patent are hereby corrected as shown below:

Column 4, second table, about line 67, in the footnote [1], "ethylene" should read -- xylene --.

Signed and sealed this 11th day of January 1972.

(SEAL)
Attest:

EDWARD M. FLETCHER, JR.    ROBERT GOTTSCHALK
Attesting Officer    Acting Commissioner of Patents